US011960632B2

(12) United States Patent
Troia et al.

(10) Patent No.: US 11,960,632 B2
(45) **Date of Patent: *Apr. 16, 2024**

(54) DATA ATTESTATION IN MEMORY

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

(*) Notice: Subject to any disclaimer, the term of this patent is extended or adjusted under 35 U.S.C. 154(b) by 242 days.

This patent is subject to a terminal disclaimer.

(21) Appl. No.: 17/516,384

(22) Filed: Nov. 1, 2021

(65) Prior Publication Data

US 2022/0058293 A1 Feb. 24, 2022

Related U.S. Application Data

(63) Continuation of application No. 16/362,916, filed on Mar. 25, 2019, now Pat. No. 11,163,912.

(51) Int. Cl.

*G06F 21/72* (2013.01)
*G06F 9/4401* (2018.01)
*H04L 9/32* (2006.01)

(52) U.S. Cl.

CPC ............ *G06F 21/72* (2013.01); *G06F 9/4401* (2013.01); *H04L 9/3242* (2013.01)

(58) Field of Classification Search

CPC ........ G06F 21/72; G06F 9/4401; G06F 21/52; G06F 21/64; G06F 12/1408; G06F 3/0611; G06F 3/062; G06F 21/602; H04L 9/3242; H04L 9/3236; H04L 9/3247; H04L 9/3263; H04L 9/0643; H04L 9/50

See application file for complete search history.

(56) References Cited

U.S. PATENT DOCUMENTS

| | | | |
|---|---|---|---|
| 9,530,004 | B2 | 12/2016 | Yajima et al. |
| 10,108,557 | B2 | 10/2018 | Durham et al. |
| 10,382,410 | B2 | 8/2019 | Jayasena et al. |
| 2002/0147918 | A1 | 10/2002 | Osthoff et al. |

(Continued)

FOREIGN PATENT DOCUMENTS

| | | |
|---|---|---|
| CN | 103034594 A | 4/2013 |
| CN | 107667374 A | 2/2018 |

(Continued)

OTHER PUBLICATIONS

U.S. Appl. No. 15/853,498, entitled, “Physical Unclonable Function Using Message Authentication Code”, filed Dec. 22, 2017, 28 pages.

(Continued)

*Primary Examiner* — Mohammad W Reza

(74) *Attorney, Agent, or Firm* — Brooks, Cameron & Huebsch, PLLC

(57) ABSTRACT

The present disclosure includes apparatuses, methods, and systems for data attestation in memory. An embodiment includes a memory, and circuitry configured to detect a power off of the apparatus, generate a run-time cryptographic hash, and compare the run-time cryptographic hash with a cryptographic hash in response to detecting the power off, wherein the cryptographic hash is stored in a portion of the memory.

20 Claims, 8 Drawing Sheets

101
105-0
105-1
105-S
103-0
103-1
103-R
107-0
BLOCK 0
107-1
BLOCK 1
107-B
BLOCK B

(56) References Cited

U.S. PATENT DOCUMENTS

| | | | | |
|---|---|---|---|---|
| 2009/0132829 | A1 | 5/2009 | Ohhashi | |
| 2010/0042824 | A1 | 2/2010 | Lee et al. | |
| 2012/0266006 | A1* | 10/2012 | Chen | G06F 11/2284 713/340 |
| 2013/0179693 | A1 | 7/2013 | Smith et al. | |
| 2014/0006696 | A1* | 1/2014 | Ramanujan | G06F 12/0246 711/103 |
| 2014/0281354 | A1 | 9/2014 | Tkacik et al. | |
| 2014/0359239 | A1 | 12/2014 | Hiremane et al. | |
| 2016/0117132 | A1* | 4/2016 | Eloy | G06F 3/0653 711/154 |
| 2016/0232105 | A1 | 8/2016 | Goss et al. | |
| 2016/0246736 | A1 | 8/2016 | Lee et al. | |
| 2016/0371267 | A1 | 12/2016 | Narasimha et al. | |
| 2018/0349646 | A1 | 12/2018 | Perone et al. | |

FOREIGN PATENT DOCUMENTS

| | | | | |
|---|---|---|---|---|
| CN | 108475237 | A | 8/2018 | |
| EP | 3384425 | B1 | 10/2018 | |
| GB | 2554940 | A * | 4/2018 | G06F 11/073 |
| JP | 2010-257340 | A | 11/2010 | |
| JP | 2015-055898 | A | 3/2015 | |

OTHER PUBLICATIONS

U.S. Appl. No. 16/201,652, entitled, “Parking Infrastructure Powered by a Decentralized, Distributed Database”, filed Nov. 27, 2018, 27 pages.

U.S. Appl. No. 15/993,119, entitled, “Transmission of Vehicle Route Information by Passive Devices”, filed May 30, 2018, 25 pages.

U.S. Appl. No. 16/034,763, entitled, “Secure Vehicular Communication”, filed Jul. 13, 2018, 37 pages.

U.S. Appl. No. 16/034,809, entitled, “Secure Vehicular Services Communication”, filed Jul. 13, 2018, 36 pages.

PCT International Application No. PCT/IB2019/000089, entitled, “Method for Improving Safety of a Component or System Running a Firmware or a Finite State Machine”, filed Feb. 22, 2019, 42 pages.

International Search Report & Written Opinion from related International Application No. PCT/US2020/022943, dated Jul. 23, 2020, 13 pages.

Notice of Rejection Ground from related Japanese Patent Application No. 2021-557310, dated Apr. 19, 2022, 4 pages.

First Office Action from related Chinese Patent Application No. 20208029448.X, dated Jun. 13, 2022, 9 pages.

* cited by examiner

DATA ATTESTATION IN MEMORY

PRIORITY INFORMATION

This application is a Continuation of U.S. application Ser. No. 16/362,916, filed on Mar. 25, 2019, which will issue as U.S. Pat. No. 11,163,912 on Nov. 2, 2021, the contents of which are incorporated herein by reference.

TECHNICAL FIELD

The present disclosure relates generally to semiconductor memory and methods, and more particularly, to data attestation in memory.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Memory devices can perform particular functions upon being powered on. Some memory devices are programmed to check data integrity (e.g., data attestation) when powered on, for example. Data attestation can increase the time it takes the device to be ready for use by a user. This latency can negatively affect a user's experience.

DETAILED DESCRIPTION

Figure 1:
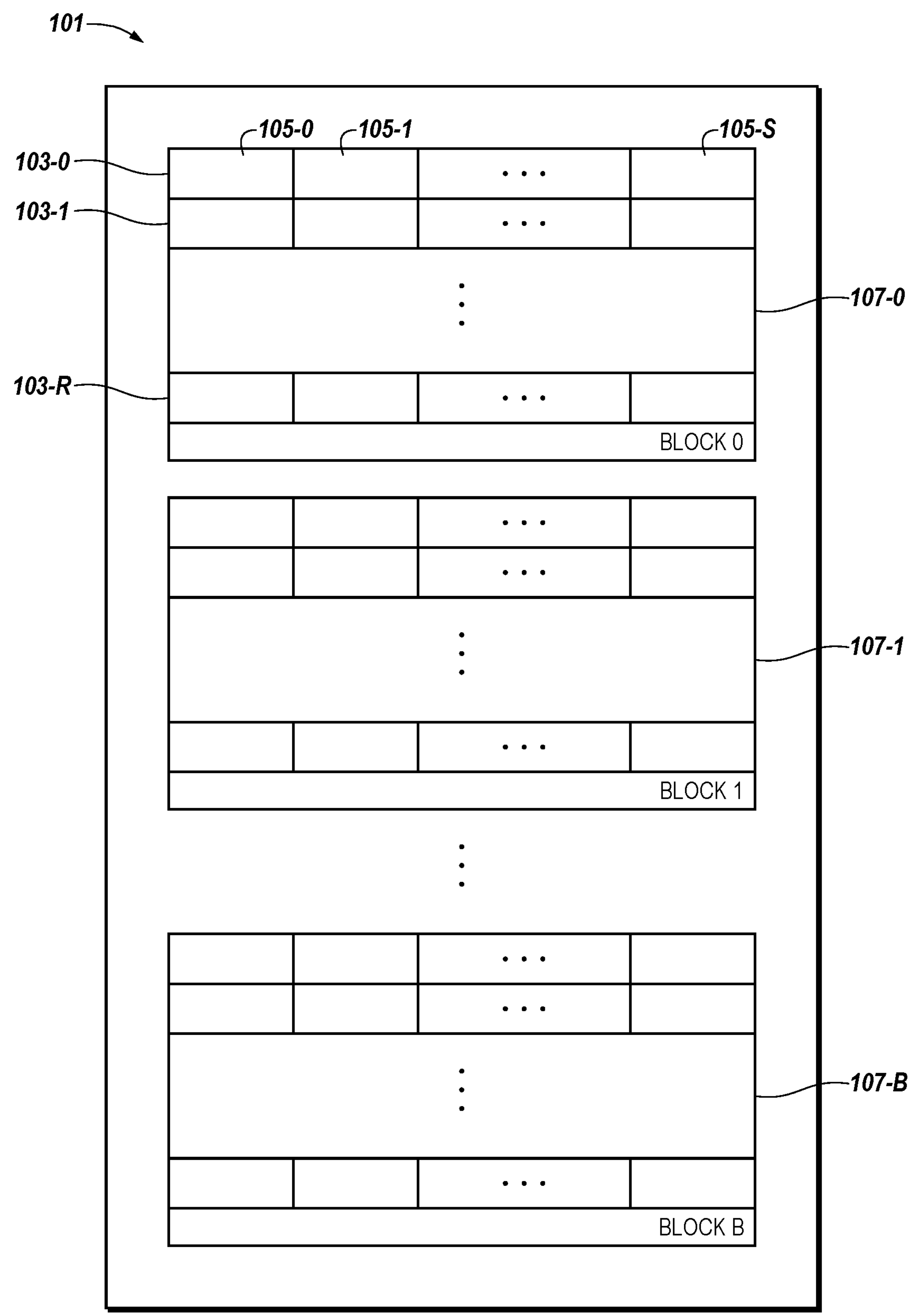
FIG. 1 illustrates a diagram of a portion of a memory array having a number of physical blocks in accordance with an embodiment of the present disclosure.

The present disclosure includes apparatuses, methods, and systems for data attestation in memory. An embodiment includes a memory, and circuitry configured to detect a power off of the apparatus, generate a run-time cryptographic hash, and compare the run-time cryptographic hash with a cryptographic hash in response to detecting the power off, wherein the cryptographic hash is stored in a portion of the memory. In some examples, detecting a power off can include, but is not limited to, receiving an instruction (e.g., command) to power off the apparatus.

Many threats can affect the data stored in a memory (e.g., in a memory device). For example, faults may occur in the array and/or circuitry of the memory, which can result in errors occurring in the data. As an additional example, a hacker or other malicious user may attempt to perform activities to make unauthorized changes to the data for malicious purposes. For instance, a malicious user may attempt to alter the data stored in a memory in order to adversely affect (e.g., divert the flow of) a commercial transaction being performed using the memory (e.g., to falsely indicate that payment has been made for the service being provided by skipping the code that verifies the payment), a software license check being performed on the memory (e.g., to falsely indicate the software of the memory is properly licensed by skipping the code that verifies the license), or automotive control being performed using the memory (e.g., to skip a check of the genuineness of a part, an environmental check, or a check of a malfunctioning alarm), among other types of hacking activities. Such hacking activities (e.g., attacks) can cause significant financial loss, and/or can present significant safety and/or security issues.

As such, in order to ensure a secure memory system, it is important to validate (e.g., authenticate and/or attest) that the data stored in the memory is genuine (e.g., is the same as originally programmed), and has not been altered by hacking activity or other unauthorized changes. However, validation that the data stored in the memory is genuine can create latency at startup of the memory device. Validating data integrity can increase the time it takes the memory device to be ready for use by a user. This latency can negatively affect a user's experience.

Embodiments of the present disclosure can perform data attestation when the device is being powered off and/or when the host is idle to reduce and/or eliminate latency at startup and improve the overall user experience of the memory device. For instance, embodiments of the present disclosure can detect a power off and/or an idle host and compare a run-time cryptographic hash with a cryptographic hash stored in a portion of the memory in response to detecting the power off and/or the idle host. In some examples, detecting a power off can include receiving a power off command from a host and detecting an idle include receiving no commands over a particular period of time from a host.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a flash memory array such as a NAND flash memory array. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, memory array 101 can be a secure memory array, as will be further described herein. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), . . . , 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, . . . , 107-B) can be included in a plane of memory cells, and a number of planes of memory cells can be included on a die. For instance, in the example shown in FIG. 1, each physical block 107-0, 107-1, . . . , 107-B can be part of a single die. That is, the portion of memory array 101 illustrated in FIG. 1 can be a die of memory cells.

As shown in FIG. 1, each physical block 107-0, 107-1, . . . , 107-B includes a number of physical rows (e.g., 103-0, 103-1, . . . , 103-R) of memory cells coupled to access lines (e.g., word lines). The number of rows (e.g., word lines) in each physical block can be 32, but embodiments are not limited to a particular number of rows 103-0, 103-1, . . . , 103-R per physical block. Further, although not shown in FIG. 1, the memory cells can be coupled to columns of sense lines (e.g., data lines and/or digit lines).

As one of ordinary skill in the art will appreciate, each row 103-0, 103-1, . . . , 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, . . . , 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, . . . , 105-S (e.g., subsets of memory cells). Each physical sector 105-0, 105-1, . . . , 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, . . . , 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, . . . , 107-B, rows 103-0, 103-1, . . . , 103-R, sectors 105-0, 105-1, . . . , 105-S, and pages are possible. For example, rows 103-0, 103-1, . . . , 103-R of physical blocks 107-0, 107-1, . . . , 107-B can each store data corresponding to a single logical sector which can include, for example, more or less than 512 bytes of data.

Figure 2:
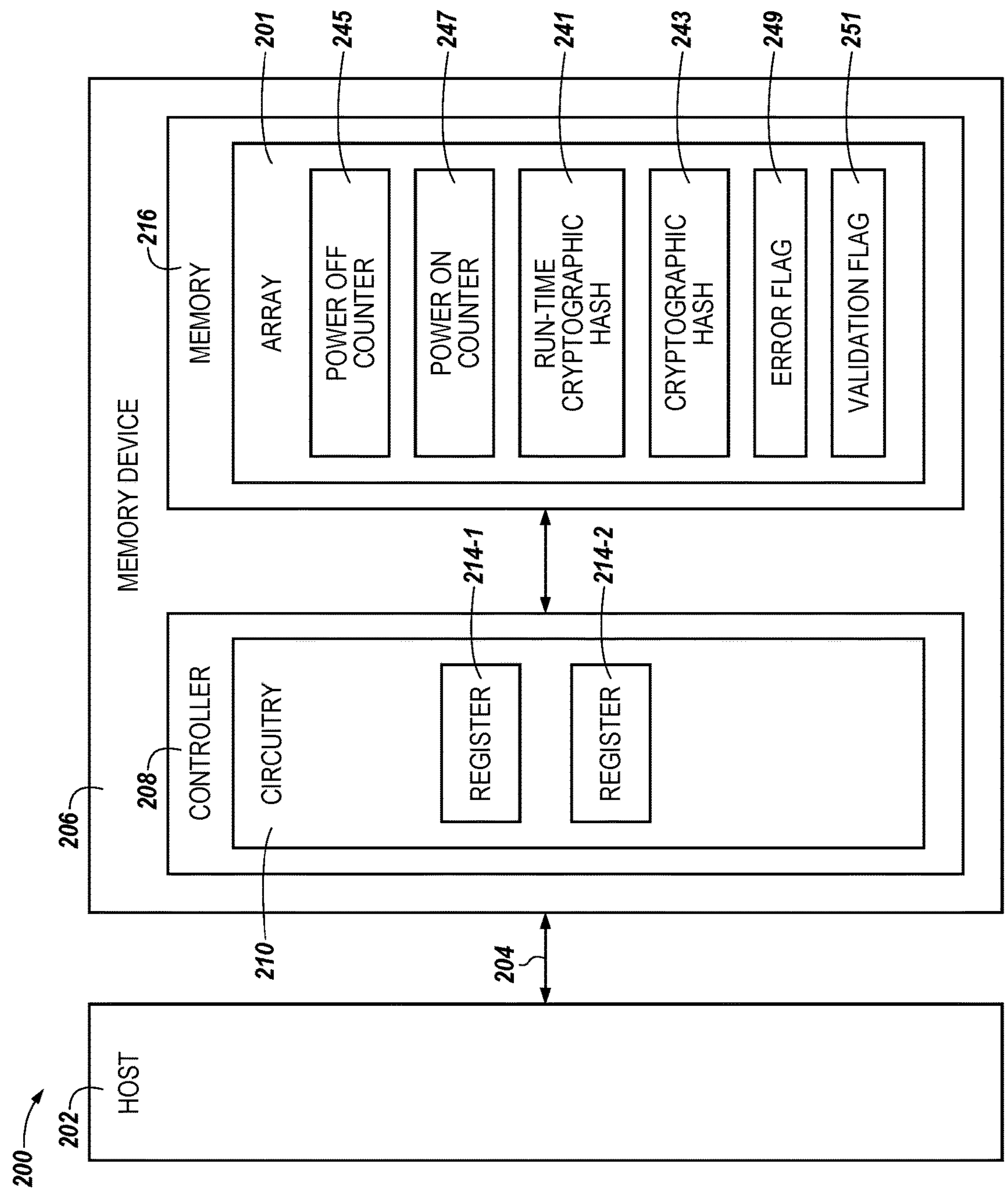
FIG. 2 is a block diagram of a computing system including a host and an apparatus in the form of a memory device in accordance with an embodiment of the present disclosure.

FIG. 2 is a block diagram of a computing system 200 including a host 202 and an apparatus in the form of a memory device 206 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 206.

In the embodiment illustrated in FIG. 2, memory device 206 can include a memory 216 having a memory array 201. Memory array 201 can be analogous to memory array 101 previously described in connection with FIG. 1. Further, memory array 201 can be a secure array, as will be further described herein. Although one memory array 201 is illustrated in FIG. 2, memory 216 can include any number of memory arrays analogous to memory array 201.

As illustrated in FIG. 2, host 202 can be coupled to the memory device 206 via interface 204. Host 202 and memory device 206 can communicate (e.g., send commands and/or data) on interface 204. Host 202 and/or memory device 206 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 204 can be in the form of a standardized physical interface. For example, when memory device 206 is used for information storage in computing system 200, interface 204 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 204 can provide an interface for passing control, address, information (e.g., data), and other signals between memory device 206 and a host (e.g., host 202) having compatible receptors for interface 204.

Memory device 206 includes controller 208 to communicate with host 202 and with memory 216 (e.g., memory array 201). For instance, controller 208 can send commands to perform operations on memory array 201, including operations to sense (e.g., read), program (e.g., write), move, and/or erase data, among other operations.

Controller 208 can be included on the same physical device (e.g., the same die) as memory 216. Alternatively, controller 208 can be included on a separate physical device that is communicatively coupled to the physical device that includes memory 216. In an embodiment, components of controller 208 can be spread across multiple physical devices (e.g., some components on the same die as the memory, and some components on a different die, module, or board) as a distributed controller.

Host 202 can include a host controller (not shown FIG. 2) to communicate with memory device 206. The host controller can send commands to memory device 206 via interface 204. The host controller can communicate with memory device 206 and/or the controller 208 on the memory device 206 to read, write, and/or erase data, among other operations. Further, in an embodiment, host 202 can be an IoT enabled device, as previously described herein, having IoT communication capabilities.

Controller 208 on memory device 206 and/or the host controller on host 202 can include control circuitry and/or logic (e.g., hardware and firmware). In an embodiment, controller 208 on memory device 206 and/or the host controller on host 202 can be an application specific integrated circuit (ASIC) coupled to a printed circuit board including a physical interface. Also, memory device 206 and/or host 202 can include a buffer of volatile and/or non-volatile memory and one or more registers.

For example, as shown in FIG. 2, memory device can include circuitry 210. In the embodiment illustrated in FIG. 2, circuitry 210 is included in controller 208. However, embodiments of the present disclosure are not so limited. For instance, in an embodiment, circuitry 210 may be included in (e.g., on the same die as) memory 216 (e.g., instead of in controller 208). Circuitry 210 can comprise, for instance, hardware, firmware, and/or software.

Circuitry 210 can generate a run-time cryptographic hash 241 for validating (e.g., authenticating and/or attesting) the data stored in memory 216 (e.g., in memory array 201). As used herein, validating the data stored in memory array 201 can include, and/or refer to, authenticating and/or attesting that the data is genuine (e.g., is the same as originally programmed), and has not been altered by hacking activity or other unauthorized changes. The run-time cryptographic hash 241 of the data stored in memory array 201 can comprise, for instance, a SHA-256 cryptographic hash. Further, the run-time cryptographic hash 241 of the data stored in memory array 201 can comprise 256 bytes of data.

The run-time cryptographic hash 241 of the data stored in memory array 201 can be generated (e.g., calculated), for example, by circuitry 210. In such an example, the run-time cryptographic hash 241 of the data stored can be internally generated by memory device 206 without having external data moving on interface 204. As an additional example, the run-time cryptographic hash 241 of the data can be communicated from an external entity. For instance, host 202 can generate the run-time cryptographic hash 241 of the data stored in memory array 201, and send the generated run-time cryptographic hash 241 to memory device 206 (e.g., circuitry 210 can receive the run-time cryptographic hash 241 of the data stored in memory array 201 from host 202).

The run-time cryptographic hash 241 can be generated (e.g., calculated), for example, by circuitry 210 based on (e.g., responsive to) an external command, such as a command received from host 202. For instance, the run-time cryptographic hash 241 can be generated by reading data stored in memory array 201 and using a hash function to hash the data. As an additional example, host 202 can generate the run-time cryptographic hash 241, and send (e.g. provide) the generated run-time cryptographic hash 241 to memory device 206 (e.g., circuitry 210 can receive the run-time cryptographic hash 241 from host 202).

As shown in FIG. 2, run-time cryptographic hash 241 can be stored in memory array 201. For example, the run-time cryptographic hash 241 can be stored in a portion of memory array 201 that is inaccessible to a user of memory device 206 and/or host 202 (e.g., in a "hidden" region of memory array 201).

In an embodiment, memory array 201 (e.g., a subset of array 201, or the whole array 201) can be a secure array (e.g., an area of memory 216 to be kept under control). In some examples, a user cannot access (e.g., write, read, or erase)

the secure array. For example, the data stored in memory array 201 can include sensitive (e.g., non-user) data, such as host firmware and/or code to be executed for sensitive applications. In such an embodiment, a pair of non-volatile registers can be used to define the secure array. For example, in the embodiment illustrated in FIG. 2, circuitry 210 includes registers 214-1 and 214-2 that can be used to define the secure array. For instance, register 214-1 can define the address (e.g., the starting LBA of the data) of the secure array, and register 214-2 can define the size (e.g., the ending LBA of the data) of the secure array. Once the secure array has been defined, circuitry 210 can generate (e.g., calculate) a cryptographic hash 243 associated with the secure array, which may be referred to herein as a golden hash 243, using authenticated and antireplay protected commands (e.g., so that only memory device 206 knows the golden hash 243, and only memory device 206 is capable of generating and updating it). The golden hash 243 may be stored in inaccessible portion of memory array 201 and can be used during the process of validating the data of the secure array, as will be further described herein.

Memory device 206 (e.g., circuitry 210) can validate the data stored in memory array 201. For example, circuitry 210 can validate the data stored in array 201, responsive to a powering (e.g., a powering on and/or powering up) of memory device 206, prior to powering off memory device 206, and/or when the host 202 is idle (e.g., host 202 sending no commands to the memory device 206). As such, a validation of the data stored in memory array 201 can be initiated (e.g., automatically) upon the powering of memory device 206, prior to powering off memory device 206 and/or when the host 202 is idle.

As an additional example, circuitry 210 can initiate a validation of the data stored in memory array 201. For instance, host 202 can send a command to memory device 206 (e.g., circuitry 210) to initiate a validation of the data stored in memory array 201.

In embodiments in which memory array 201 is a secure array, the golden hash 243 previously described herein may also be used to validate the data stored in memory array 201. For example, a run-time cryptographic hash 241 can be generated (e.g., calculated) and compared with the golden hash 243. If the comparison indicates the run-time cryptographic hash 241 and golden hash 243 match (e.g., equal), it can be determined that the secure array has not been altered, and therefore the data stored therein is valid. If, however, the comparison indicates the run-time cryptographic hash 241 and golden hash 243 do not match, this may indicate that the data stored in the secure array has been changed (e.g., due to a hacker or a fault in the memory), and this can be reported to host 202.

The run-time cryptographic hash 241 can be generated and/or compared with the golden hash 243 in response to circuitry 210 detecting a power off of the computing system 200. The circuitry 210 can detect the power off by the controller 208 receiving a power off command from host 202, for example. In some examples, the run-time cryptographic hash 241 can be generated and/or compared with the golden hash 243 in response to circuitry 210 detecting the host 202 is idle. In some examples, the circuitry 210 can determine the host 202 is idle when controller 208 has no pending commands from the host 202.

As shown in FIG. 2, a power off counter 245 and/or a power on counter 247 can be, but is not limited to being, stored in memory array 201. In some examples, the power off counter 245, a power off number counted by the power off counter 245, the power on counter 247, and/or a power on number counted by the power on counter 247 can be stored in a portion of memory array 201 that is inaccessible to a user of memory device 206 and/or host 202 (e.g., in a "hidden" region of memory array 201). For example, the power off number counted by the power off counter 245 and/or the power on number counted by the power on counter 247 can be stored in the hidden region of memory array 201 to prevent the host 202 from modifying the number counted by the power off counter 245 and/or the number counted by the power on counter 245. In some examples, the power off counter 245 and/or the power on counter 247 can be monotonic counters. The power off counter 245 can be incremented each time the computing system 200 is powered off and the power on counter 247 can be incremented each time the computing system 200 is powered on. For example, the power off counter can be incremented prior to the computing system 200 powering off (e.g., when the memory device 206 receives a power off command from the host 202) and/or in response to the run-time cryptographic hash and the cryptographic hash being equal.

In some embodiments, the array 201 and/or a portion of array 201 can be set to read only mode in response to incrementing the power off counter 245 and/or prior to powering off the computing system 200. For example, a portion of memory array 201 that is inaccessible to a user of memory device 206 and/or host 202 (e.g., a "hidden" region of memory array 201) can be set to read only mode. Adjusting the memory array 201 and/or a portion of memory array 201 to read only can prevent the memory array 201 and/or a portion of memory array 201 from being corrupted.

The power on counter 247 can be incremented in response to powering on the computing system 200 For example, the power on counter 247 can be incremented in response to the computing system 200 receiving a power on command. The power off counter 245 can be compared to the power on counter 247 in response to incrementing the power on counter 247 and/or upon powering on the computing system 200. In some examples, the memory array 201 can be set to read and write mode in response to the power on counter 245 and the power off counter 247 being equal.

As shown in FIG. 2, an error flag 249 can be stored in memory array 201. For example, the error flag 249 can be stored in a portion of memory array 201 that is inaccessible to a user of memory device 206 and/or host 202 (e.g., in a "hidden" region of memory array 201). The error flag 249 can be provided in response to the data of array 201 being corrupted. For example, the power on counter 247 and the power off counter 245 being unequal indicates the data of array 201 is corrupted. In some examples, data can be recovered in the array 201 to replace the corrupted data in response to the power on counter 247 and the power off counter 245 being unequal.

In some examples, a validation flag 251 can be stored in memory array 201. The validation flag 251 can be stored in a portion of memory array 201 that is inaccessible to a user of memory device 206 and/or host 202 (e.g., in a "hidden" region of memory array 201). The validation flag 251 can indicate that the data of array 201 has been validated. The validation flag 251 can also indicate that the data of array 201 has not been modified since it was validated and as such the data of array 201 does not need to be validated. Accordingly, the validation flag 251 can be triggered in response to the run-time cryptographic hash 241 and the cryptographic hash 243 being equal. The computing system 200 including memory 216 can be powered off in response to the validation flag 251 being triggered because the data of array 201 has been validated. In some examples, the validation flag 251 can be removed in response to a write operation in the array 201 prior to powering off the computing system 200. If a write operation in the array 201 occurs prior to powering off the computing system, the data of array 201 may need to be validated prior to powering off the computing system 200 to prevent latency at startup. In some examples, the validation flag 251 can be cleared (e.g., removed) in response to powering on the computing system 200 so that the data of the array 201 can be validated prior to powering off the computing system 200.

The embodiment illustrated in FIG. 2 can include additional circuitry, logic, and/or components not illustrated so as not to obscure embodiments of the present disclosure. For example, memory device 206 can include address circuitry to latch address signals provided over I/O connectors through I/O circuitry. Address signals can be received and decoded by a row decoder and a column decoder, to access memory array 201. Further, memory device 206 can include a main memory, such as, for instance, a DRAM or SDRAM, that is separate from and/or in addition to memory array 201. An example further illustrating additional circuitry, logic, and/or components of memory device 206 will be further described herein (e.g., in connection with FIG. 9).

Figure 3:
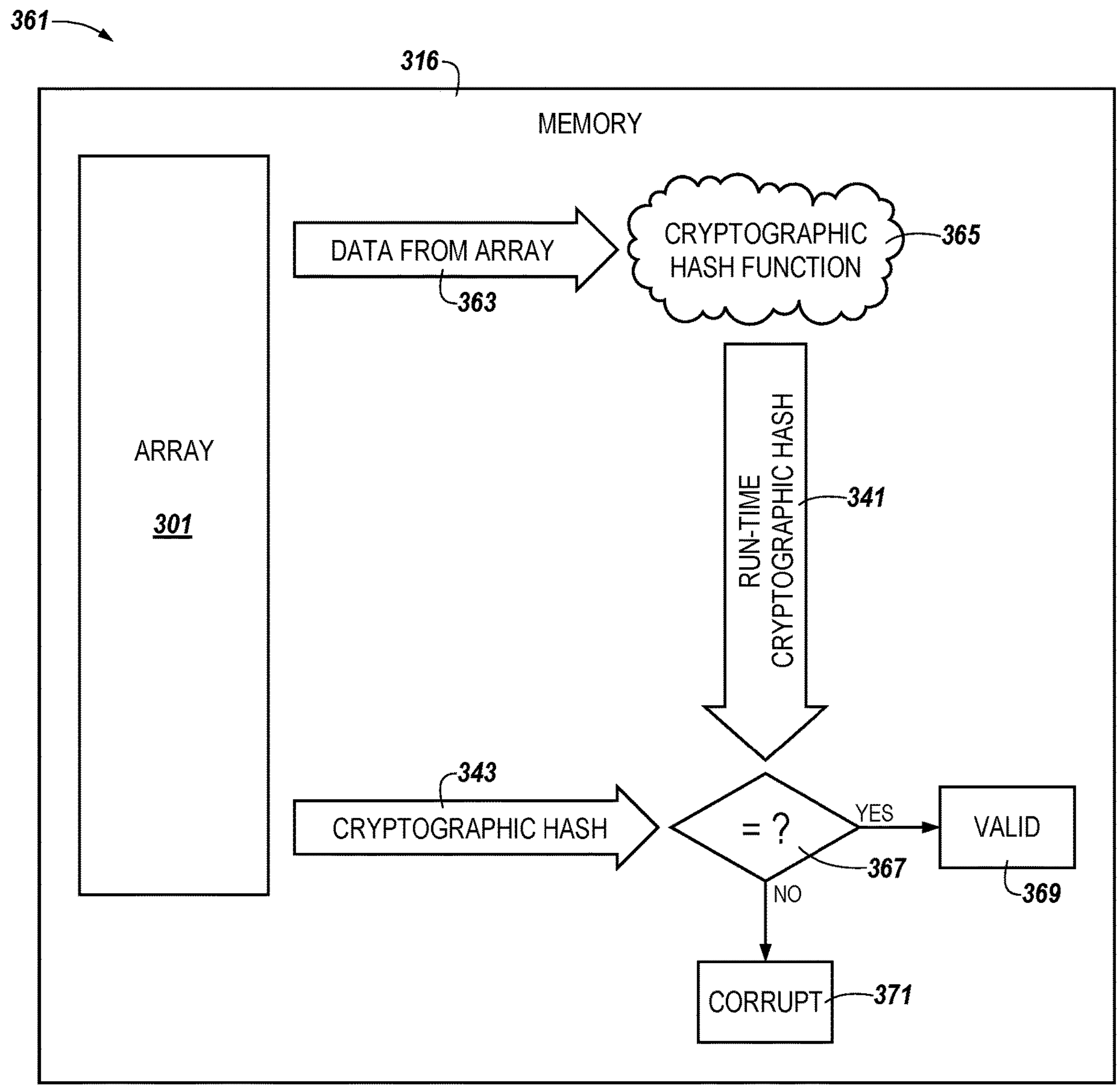
FIG. 3 is a block diagram of an example data attestation process in accordance with an embodiment of the present disclosure.

FIG. 3 is a block diagram of an example data attestation process 361 in accordance with an embodiment of the present disclosure. The data attestation process 361 can include generating a run-time cryptographic hash 341 for validating (e.g., authenticating and/or attesting) the data 363 stored in memory 316 (e.g., in memory array 301). As used herein, validating the data 363 stored in memory array 301 can include, and/or refer to, authenticating and/or attesting that the data 363 is genuine (e.g., is the same as originally programmed), and has not been altered by hacking activity or other unauthorized changes. The run-time cryptographic hash 341 can be generated by reading data 363 stored in memory array 301 and using a cryptographic hash function 365 to hash the data 363. In some examples, the cryptographic hash function 365 can be a SHA-256 cryptographic hash function.

As shown in FIG. 2, run-time cryptographic hash 341 (e.g., run-time cryptographic hash 241 in FIG. 2) can be stored in memory array 301 (e.g., memory array 201 in FIG. 2). For example, the run-time cryptographic hash 341 can be stored in a portion of memory array 301 that is inaccessible to a user of memory device (e.g., memory device 206 in FIG. 2) and/or host (e.g., host 202 in FIG. 2).

In an embodiment, memory array 301 (e.g., a subset of array 301, or the whole array 301) can be a secure array (e.g., an area of memory 316 to be kept under control). For example, the data stored in memory array 301 can include sensitive (e.g., non-user) data, such as host firmware and/or code to be executed for sensitive applications. In such an embodiment, a pair of non-volatile registers can be used to define the secure array. For example, in the embodiment illustrated in FIG. 2, circuitry 210 includes registers 214-1 and 214-2 that can be used to define the secure array. Once the secure array has been defined, circuitry can generate (e.g., calculate) a cryptographic hash 343 associated with the secure array, which may be referred to herein as a golden hash 343, using authenticated and anti-replay protected commands (e.g., so that only memory device knows the golden hash 343, and only the memory device is capable of generating and updating it). The golden hash 343 may be stored in inaccessible portion of memory array 301 and can be used during the process of validating the data of the secure array.

The data attestation process 361 can begin in response to a powering (e.g., a powering on and/or powering up) of memory device (e.g., memory device 206 in FIG. 2), prior to powering off the memory device, and/or when the host (e.g., host 202 in FIG. 2) is idle. As such, a validation of the data 363 stored in memory array 301 can be initiated (e.g., automatically) upon the powering of the memory device, prior to powering off memory device, and/or when the host is idle. As an additional example, the data attestation process 361 can be initiated in response to receiving a command from the host to initiate a validation of the data 363 stored in the memory array 301.

The run-time cryptographic hash 341 can be generated (e.g., calculated), and compared with the golden hash 343. If the comparison 367 indicates the run-time cryptographic hash 341 and golden hash 343 match (e.g., equal), it can be determined that the secure array 301 has not been altered, and therefore the data 363 stored therein is valid 369 and the data attestation process 361 can be complete. In some examples, a validation flag (e.g., validation flag 251 in FIG. 2) can be triggered in response to the run-time cryptographic hash 341 and the golden hash 343 matching. The validation flag can indicate that the data 363 of the secure array 301 has been validated, as previously described herein (e.g., in connection with FIG. 2). If, however, the comparison 367 indicates the run-time cryptographic hash 341 and golden hash 343 do not match, this may indicate that the data 363 stored in the secure array 301 has been corrupted 371 (e.g., due to a hacker or a fault in the memory). The corruption of the data 363 of the secure array 301 can be reported to the host (e.g., host 202 in FIG. 2). In some examples, the data 363 of the secure array 301 can be restored.

The run-time cryptographic hash 341 can be generated and/or compared with the golden hash 343 in response to detecting a power off of the computing system (e.g., computing system 200 in FIG. 2). In some examples, the run-time cryptographic hash 341 can be generated and/or compared with the golden hash 343 in response to detecting the host (e.g., host 202 in FIG. 2) being idle. In some examples, the host can be idle when there are no pending commands from the host.

Figure 4:
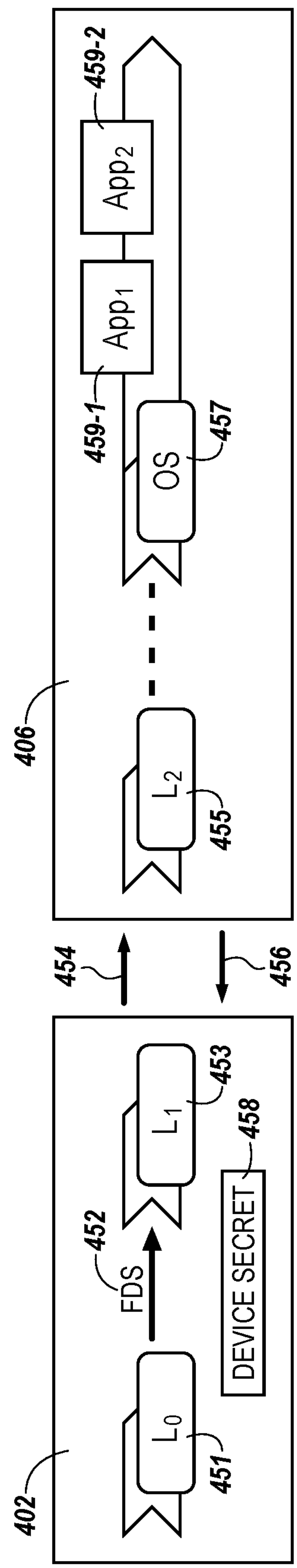
FIG. 4 is a block diagram of an example system including a host and a memory device in accordance with an embodiment of the present disclosure.

FIG. 4 is a block diagram of an example system including a host 402 and a memory device 406 in accordance with an embodiment of the present disclosure. Host 402 and memory device 406 can be, for example, host 202 and memory device 206, respectively, previously described in connection with FIG. 2.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 4, Layer 0 ("$L_0$") 451 and Layer 1 ("$L_1$") 453 are within the host. Layer 0 451 can provide a Firmware Derivative Secret (FDS) key 452 to Layer 1 453. The FDS key 452 can describe the identity of code of Layer 1 453 and other security relevant data. In an example, a particular protocol (such as robust internet of things (RIOT) core protocol) can use the FDS 452 to validate code of Layer 1 453 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 458 can be used to create the FDS 452 and be stored in memory of the host 402.

The host can transmit data, as illustrated by arrow 454, to the memory device 406. The transmitted data can include an external identification that is public, a certificate (e.g., an external identification certificate), and/or an external public key. Layer 2 ("$L_2$") 455 of the memory device 406 can receive the transmitted data, and execute the data in operations of the operating system ("OS") 457 and on a first application 459-1 and a second application 459-2.

In an example operation, the host 402 can read the device secret 458, hash an identity of Layer 1 453, and perform a calculation including:

$$K_{L1}=\text{KDF}[\text{Fs}(s),\text{Hash}(\text{"immutable information"})]$$

where $K_{L1}$ is an external public key, KDF (e.g., KDF defined in the National Institute of Standards and Technology (NIST) Special Publication 800-108) is a key derivation function (e.g., HMAC-SHA256), and Fs(s) is the device secret 558. FDS 552 can be determined by performing:

$$\text{FDS}=\text{HMAC-SHA256}[\text{Fs}(s),\text{SHA256}(\text{"immutable information"})]$$

Likewise, the memory device 406 can transmit data, as illustrated by arrow 456, to the host 402.

Figure 5:
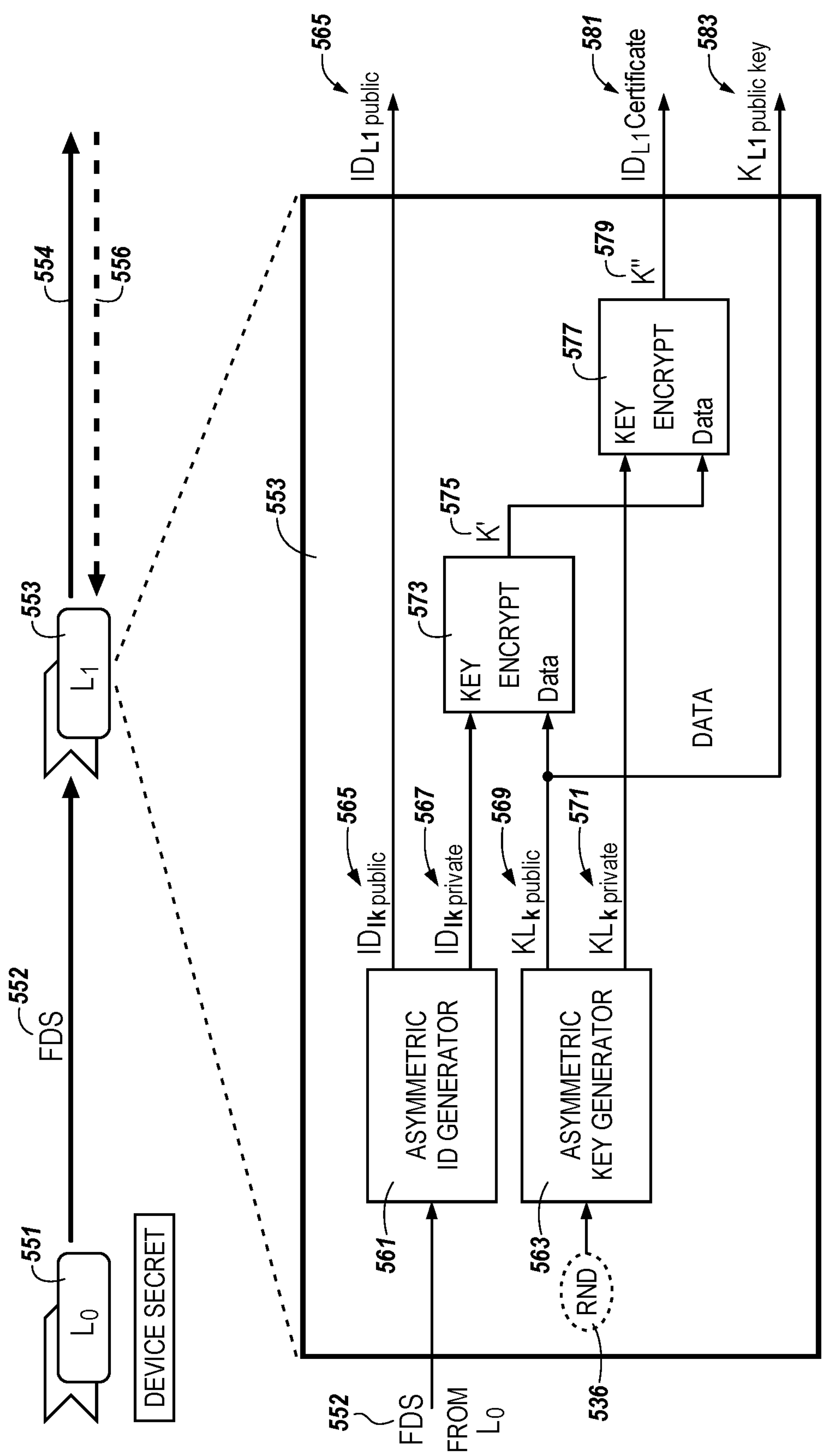
FIG. 5 is a block diagram of an example process to determine a number of parameters in accordance with an embodiment of the present disclosure.

FIG. 5 is a block diagram of an example process to determine a number of parameters in accordance with an embodiment of the present disclosure. FIG. 5 is an example of a determination of the parameters including the external public identification, the external certificate, and the external public key that are then sent, indicated by arrow 554, to Layer 2 (e.g., Layer 2 455) of a memory device (e.g., 406 in FIG. 4). Layer 0 ("$L_0$") 551 in FIG. 5 corresponds to Layer 0 451 in FIG. 4 and likewise FDS 552 corresponds to FDS 452, Layer 1 553 corresponds to Layer 1 453, and arrows 554 and 556 correspond to arrows 454 and 456, respectively.

The FDS 552 from Layer 0 551 is sent to Layer 1 553 and used by an asymmetric ID generator 561 to generate a public identification ("$ID_{lk\ public}$") 565 and a private identification 567. In the abbreviated "ID $ID_{lk\ public}$," the "lk" indicates Layer k (in this example Layer 1), and the "public" indicates that the identification is openly shared. The public identification 565 is illustrated as shared by the arrow extending to the right and outside of Layer 1 553 of the host. The generated private identification 567 is used as a key input into an encryptor 573. The encryptor 573 can be any processor, computing device, etc. used to encrypt data.

Layer 1 553 of a host can include an asymmetric key generator 563. In at least one example, a random number generator (RND) 536 can optionally input a random number into the asymmetric key generator 563. The asymmetric key generator 563 can generate a public key ("$K_{Lk\ public}$") 569 (referred to as an external public key) and a private key ("$K_{LK\ private}$") 571 (referred to as an external private key) associated with a host such as host 402 in FIG. 4. The external public key 569 can be an input (as "data") into the encryptor 573. The encryptor 573 can generate a result K'575 using the inputs of the external private identification 567 and the external public key 569. The external private key 571 and the result K'575 can be input into an additional encryptor 577, resulting in output K" 579. The output K" 579 is the external certificate ("$ID_{L1\ certificate}$") 581 transmitted to the Layer 2 (455 of FIG. 4). The external certificate 581 can provide an ability to verify and/or authenticate an origin of data sent from a device. As an example, data sent from the host can be associated with an identity of the host by verifying the certificate, as will be described further in association with FIG. 7. Further, the external public key ("$K_{L1\ public\ key}$") 583 can be transmitted to Layer 2. Therefore, the public identification 565, the certificate 581, and the external public key 583 of a host can be transmitted to Layer 2 of a memory device.

Figure 6:
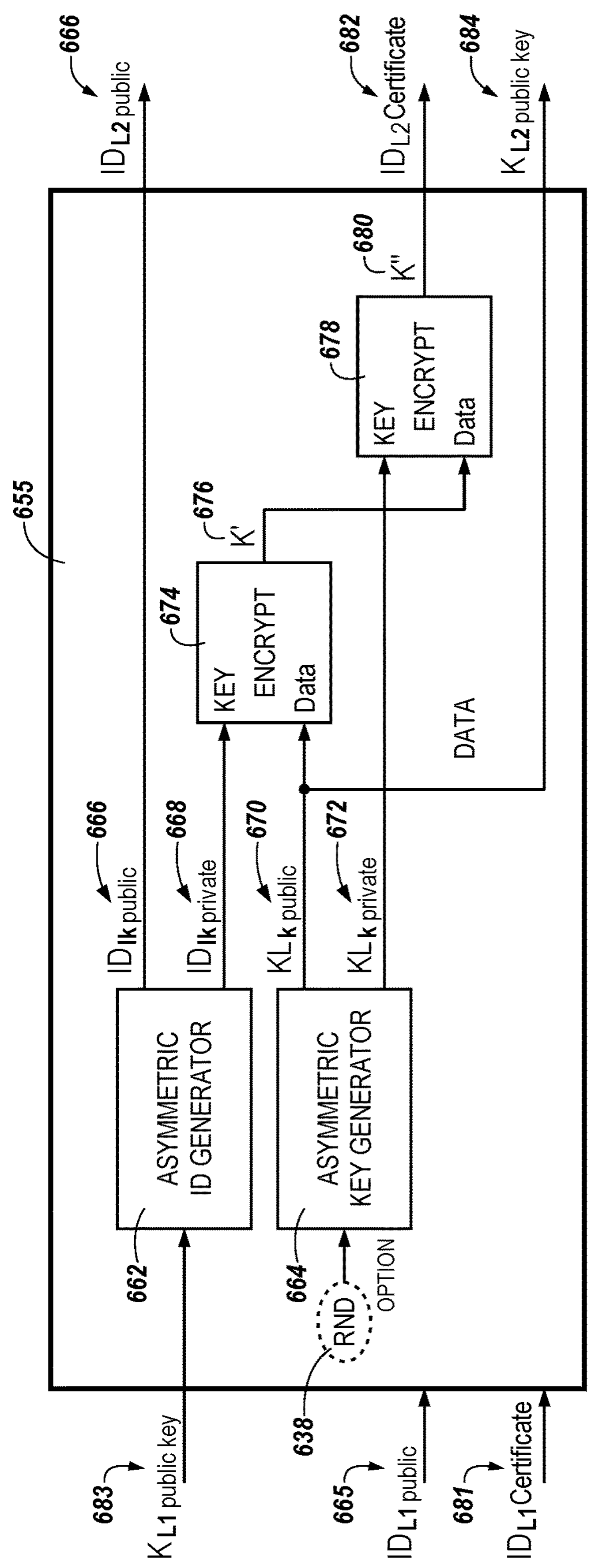
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 illustrates a Layer 2 655 of a memory device (e.g., memory device 406 in FIG. 4) generating a device identification ("$ID_{L2\ public}$") 666, a device certificate ("$ID_{L2\ Certificate}$") 682, and a device public key ("$K_{L2\ public\ key}$") 684.

The external public key ("$K_{L1\ public\ key}$") 683 transmitted from Layer 1 of the host to Layer 2 655 of a memory device, as described in FIG. 5, is used by an asymmetric ID generator 662 of the memory device to generate a public identification ("$ID_{lk\ public}$") 666 and a private identification 668 of the memory device. In the abbreviated "ID $ID_{lk\ public}$," the "lk" indicates Layer k (in this example Layer 2), and the "public" indicates that the identification is openly shared. The public identification 666 is illustrated as shared by the arrow extending to the right and outside Layer 2 655. The generated private identification 668 is used as a key input into an encryptor 674.

Layer 2 655 of the memory device can include an asymmetric key generator 664. In at least one example, a random number generator (RND) 638 can optionally input a random number into the asymmetric key generator 664. The asymmetric key generator 664 can generate a public key ("$K_{Lk\ public}$") 670 (referred to as a device public key) and a private key ("$K_{LK\ private}$") 672 (referred to as a device private key) associated with a memory device such as memory device 406 in FIG. 4. The device public key 670 can be an input (as "data") into the encryptor 674. The encryptor 674 can generate a result K' 676 using the inputs of the device private identification 668 and the device public key 670. The device private key 672 and the result K' 676 can be input into an additional encryptor 678, resulting in output K" 680. The output K" 680 is the device certificate ("$ID_{L2}$ certificate") 682 transmitted back to the Layer 1 (e.g., layer 1 453 in FIG. 4). The device certificate 682 can provide an ability to verify and/or authenticate an origin of data sent from a device. As an example, data sent from the memory device can be associated with an identity of the memory device by verifying the certificate, as will be described further in association with FIG. 7. Further, the device public key ("$K_{L2\ public\ key}$") 684 can be transmitted to Layer 1. Therefore, the public identification 666, the certificate 682, and the device public key 684 of the memory device can be transmitted to Layer 1 of a host.

In an example, in response to a host receiving a public key from a memory device, the host can encrypt data to be sent to the memory device using the device public key. Vice versa, the memory device can encrypt data to be sent to the host using the external public key. In response to the memory device receiving data encrypted using the device public key, the memory device can decrypt the data using its own device private key. Likewise, in response to the host receiving data encrypted using the external public key, the host can decrypt the data using its own external private key. As the device private key is not shared with another device outside the memory device and the external private key is not shared with another device outside the host, the data sent to the memory device and the host remains secure.

Figure 7:
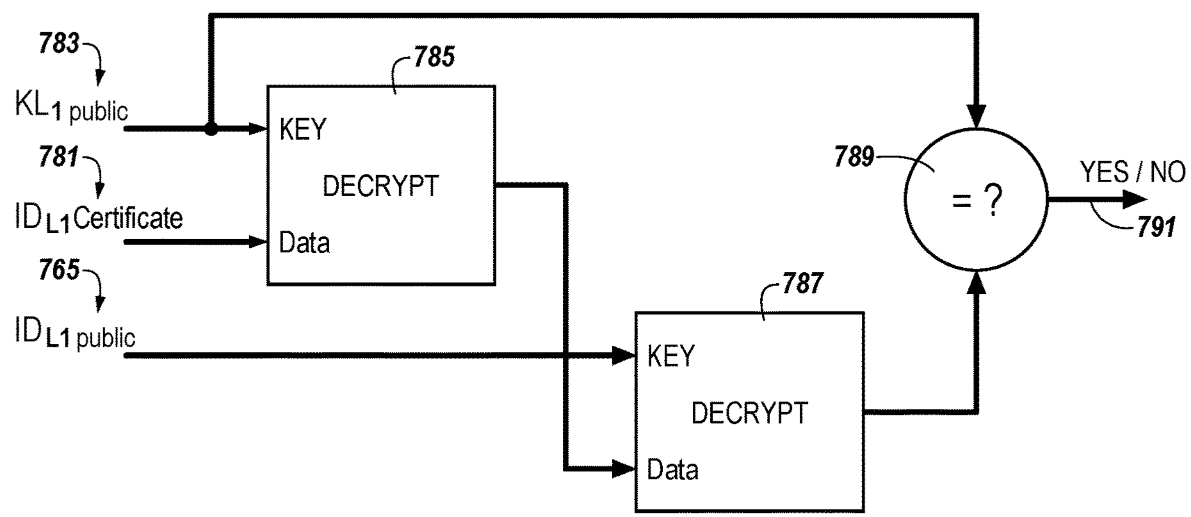
FIG. 7 is a block diagram of an example process to verify a certificate in accordance with an embodiment of the present disclosure.

FIG. 7 is a block diagram of an example process to verify a certificate in accordance with an embodiment of the present disclosure. In the illustrated example of FIG. 7, a public key 783, a certificate 781, and a public identification 765 is provided from a host (e.g., from Layer 1 453 of host 402 in FIG. 4). The data of the certificate 781 and the external public key 783 can be used as inputs into a decryptor 785. The decryptor 785 can be any processor, computing device, etc used to decrypt data. The result of the decryption of the certificate 781 and the external public key 783 can be used as an input into a secondary decryptor 787 along with the public identification, result in an output. The external public key 783 and the output from the decryptor 787 can indicate, as illustrated at 789, whether the certificate is verified, resulting in a yes or no 791 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 8:
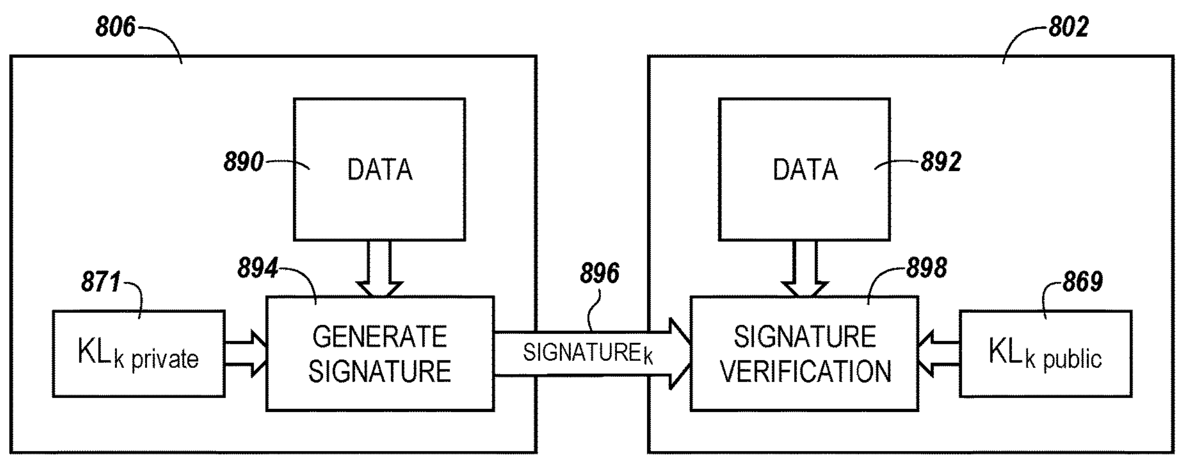
FIG. 8 is a block diagram of an example process to verify a signature in accordance with an embodiment of the present disclosure.

FIG. 8 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A memory device 806 (such as memory device 206 in FIG. 2) can send data 890 to a host (such as host 202 in FIG. 2). The memory device 806 can generate, at 894, a signature 896 using a device private key 871. The signature 896 can be transmitted to the host 802. The host 802 can verify, at 898, the signature using data 892 and the external public key 869 previously received. In this way, the signature is generated using a private key and verified using a public key. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 9:
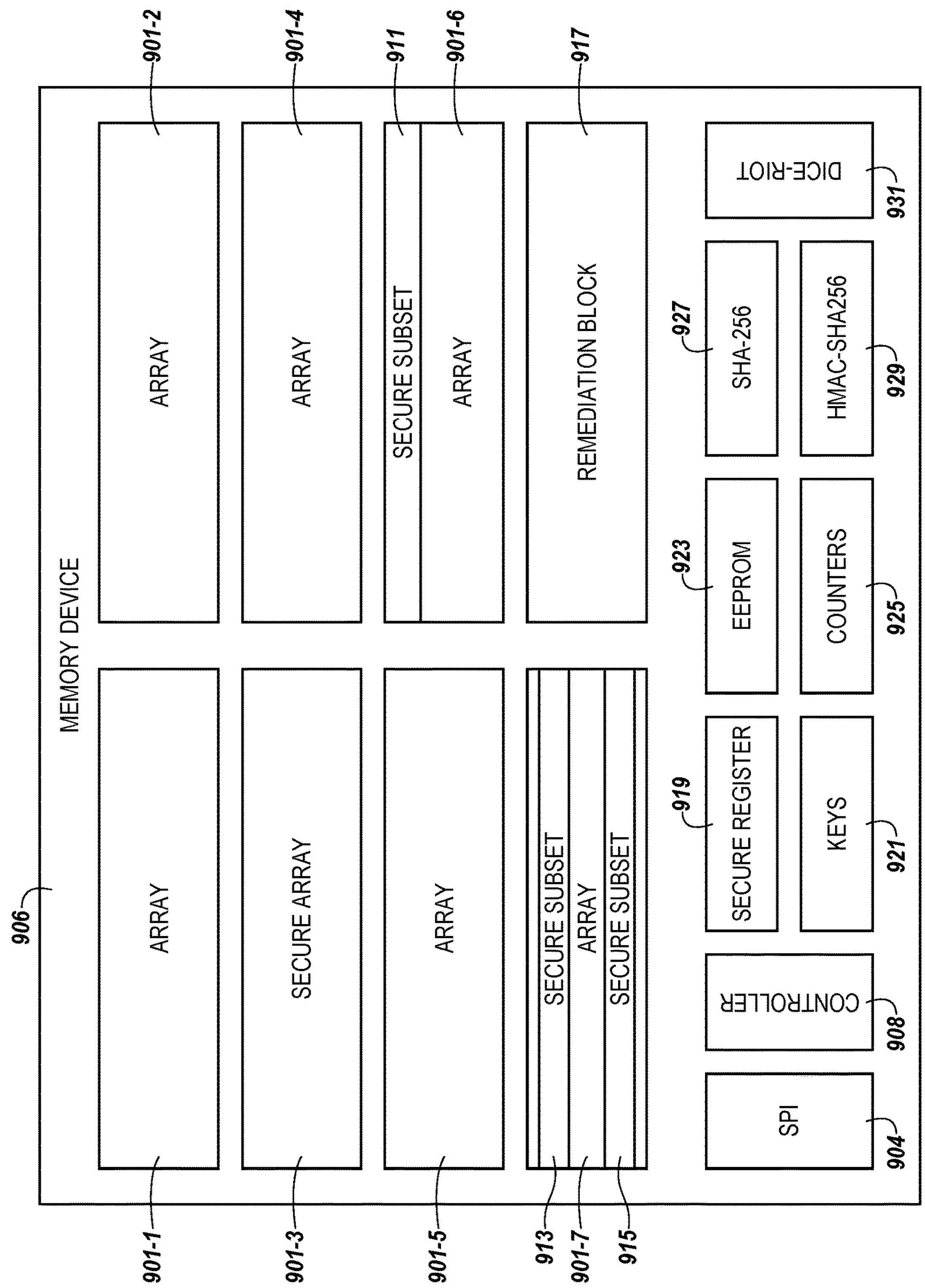
FIG. 9 is a block diagram of an example memory device in accordance with an embodiment of the present disclosure.

FIG. 9 is a block diagram of an example memory device 906 in accordance with an embodiment of the present disclosure. Memory device 906 can be, for example, memory device 206 previously described in connection with FIG. 2.

As shown in FIG. 9, memory device 906 can include a number of memory arrays 901-1 through 901-7. Memory arrays 901-1 through 901-7 can be analogous to memory array 101 previously described in connection with FIG. 1. Further, in the example illustrated in FIG. 9, memory array 901-3 is a secure array, subset 911 of memory array 901-6 comprises a secure array, and subsets 913 and 915 of memory array 901-7 comprise a secure array. Subsets 911, 913, and 915 can each include, for instance, 4 kilobytes of data. However, embodiments of the present disclosure are not limited to a particular number or arrangement of memory arrays or secure arrays.

As shown in FIG. 9, memory device 906 can include a remediation (e.g., recovery) block 917. Remediation block 917 can be used as a source of data in case of errors (e.g., mismatches) that may occur during operation of memory device 906. Remediation block 917 may be outside of the area of memory device 906 that is addressable by a host.

As shown in FIG. 9, memory device 906 can include a serial peripheral interface (SPI) 904 and a controller 908. Memory device 906 can use SPI 904 and controller 908 to communicate with a host and memory arrays 901-1 through 901-7, as previously described herein (e.g., in connection with FIG. 2).

As shown in FIG. 9, memory device 906 can include a secure register 919 for managing the security of memory device 906. For example, secure register 919 can configure, and communicate externally, to an application controller. Further, secure register 919 may be modifiable by an authentication command.

As shown in FIG. 9, memory device 906 can include keys 921. For instance, memory device 906 can include eight different slots to store keys such as root keys, DICE-RIOT keys, and/or other external session keys.

As shown in FIG. 9, memory device 906 can include an electronically erasable programmable read-only memory (EEPROM) 923. EEPROM 923 can provide a secure non-volatile area available for a host, in which individual bytes of data can be erased and programmed.

As shown in FIG. 9, memory device 906 can include counters (e.g., monotonic counters) 925. Counters 925 can be used as an anti-replay mechanism (e.g., freshness generator) for commands (e.g., to sign a command set or sequence) received from and/or sent to a host. For instance, memory device 906 can include six different monotonic counters, two of which may be used by memory device 906 for the authenticated commands, and four of which may be used by the host.

As shown in FIG. 9, memory device 906 can include a SHA-256 cryptographic hash function 927, and/or an HMAC-SHA256 cryptographic hash function 929. SHA-256 and/or HMAC-SHA256 cryptographic hash functions 927 and 929 can be used by memory device 906 to generate cryptographic hashes and/or a golden hash used to validate the data stored in memory arrays 901-1 through 901-7 as previously described herein. Further, memory device 906 can support L0 and L1 of DICE-RIOT 931.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory; and
circuitry configured to:
increment a power off counter;
power off the apparatus;
power on the apparatus subsequent to powering off the apparatus;
increment a power on counter in response to powering on the apparatus;
determine, in response to incrementing the power on counter, if the power on counter is equal to the power off counter; and
provide an error flag stored in a portion of the memory that is inaccessible to a user of the apparatus in response to determining the power on counter and the power off counter are not equal.

2. The apparatus of claim 1, wherein the circuitry is configured to increment the power off counter in response to receiving a command to power off the apparatus.

3. The apparatus of claim 1, wherein the circuitry is configured to increment the power off counter in response to a particular period of time passing without the apparatus receiving a command.

4. The apparatus of claim 1, wherein the circuitry is configured to set the portion of the memory to read and write mode in response to determining the power on counter and the power off counter are equal.

5. The apparatus of claim 1, wherein the circuitry is configured to set the portion of the memory to read only mode in response to incrementing the power off counter.

6. The apparatus of claim 1, wherein the circuitry is configured to recover data in the memory in response to determining the power on counter and the power off counter are not equal.

7. The apparatus of claim 1, wherein the circuitry is configured to store the error flag in the memory.

8. The apparatus of claim 1, wherein the memory is inaccessible to a host.

9. A method of data attestation in memory, comprising:
incrementing a power off counter;
setting a portion of the memory to read only mode in response to incrementing the power off counter, wherein the portion of the memory is inaccessible to a user of the memory;
powering off the memory;
powering on the memory subsequent to powering off the memory;
incrementing a power on counter in response to powering on the memory;
determining, in response to incrementing the power on counter, if the power on counter is equal to the power off counter; and
providing an error flag stored in the portion of the memory that is inaccessible to a user of the memory in response to determining the power on counter and the power off counter are not equal.

10. The method of claim 9, further comprising:
receiving a command to power off the memory or detecting a host is idle in response to a particular period of time passing without receiving a command from the host; and
generating a run-time cryptographic hash in response to receiving the command to power off the memory or detecting the host is idle.

11. The method of claim 10, further comprising comparing the run-time cryptographic hash with a golden cryptographic hash in response to receiving the command to power off the memory or detecting the host is idle.

12. The method of claim 11, further comprising incrementing the power off counter in response to the run-time cryptographic hash and the golden cryptographic hash being equal.

13. The method of claim 11, further comprising generating the golden cryptographic hash using authenticated and antireplay protected commands.

14. The method of claim 11, further comprising storing the golden cryptographic hash in the portion of the memory.

15. A system, comprising:
a host;
a memory; and
circuitry configured to:
detect when the host is idle in response to a particular period of time passing without receiving a command from the host or receive a command to power off the memory;
generate a run-time cryptographic hash by reading data stored in a portion of the memory and using a hash function to hash the data in response to detecting the host is idle or receiving the command to power off the memory, wherein the portion of the memory is inaccessible to a user of the memory;
compare the run-time cryptographic hash with a golden cryptographic hash in response to generating the run-time cryptographic hash;
increment a power off counter in response to the run-time cryptographic hash and the golden cryptographic hash being equal;
power off the memory;
power on the memory subsequent to powering off the memory;
increment a power on counter in response to powering on the memory;
determine, in response to incrementing the power on counter, if the power on counter is equal to the power off counter; and
provide an error flag stored in the portion of the memory that is inaccessible to a user of the memory in response to determining the power on counter and the power off counter are not equal.

16. The system of claim 15, wherein the circuitry is configured to trigger a validation flag in response to the golden cryptographic hash and the run-time cryptographic hash being equal.

17. The system of claim 16, wherein the circuitry is configured to remove the validation flag in response to a write operation being performed on the portion of the memory prior to powering off the system.

18. The system of claim 15, wherein the portion of the memory is a secure portion of the memory.

19. The system of claim 15, wherein the circuitry comprises one or more registers, wherein the portion of the memory is defined by the one or more registers.

20. The apparatus of claim 15, wherein the power off counter and the power on counter are monotonic counters.

* * * * *